(12) United States Patent
Korhonen

(10) Patent No.: US 10,876,555 B2
(45) Date of Patent: Dec. 29, 2020

(54) FASTENING DEVICE FOR FASTENING ELEMENTS

(71) Applicant: INNVOLVE OY, Helsinki (FI)

(72) Inventor: Mika Korhonen, Espoo (FI)

(73) Assignee: INNVOLVE OY, Helsinki (FI)

( * ) Notice: Subject to any disclaimer, the term of this patent is extended or adjusted under 35 U.S.C. 154(b) by 77 days.

(21) Appl. No.: 16/098,448

(22) PCT Filed: May 4, 2017

(86) PCT No.: PCT/FI2017/050346
§ 371 (c)(1),
(2) Date: Nov. 2, 2018

(87) PCT Pub. No.: WO2017/191369
PCT Pub. Date: Nov. 9, 2017

(65) Prior Publication Data
US 2019/0093686 A1 Mar. 28, 2019

(30) Foreign Application Priority Data

May 4, 2016 (FI) .................................... 20165384

(51) Int. Cl.
*F16B 2/24* (2006.01)
*E04F 13/08* (2006.01)
(Continued)

(52) U.S. Cl.
CPC .......... *F16B 2/245* (2013.01); *E04F 13/0883* (2013.01); *F16B 5/0008* (2013.01);
(Continued)

(58) Field of Classification Search
CPC .................. F16B 2/245; E04F 13/0883; E04F 2201/0107
See application file for complete search history.

(56) References Cited

U.S. PATENT DOCUMENTS 2,654,131 A 10/1953 Polipitch
3,516,112 A 6/1970 Neville et al.
(Continued)

FOREIGN PATENT DOCUMENTS

CA 2854739 A1 12/2015
CN 86108815 A 6/1987
(Continued)

OTHER PUBLICATIONS

Finnish Patent and Registration Office, Search report of Finnish application No. 20165384, dated Nov. 4, 2016, 1 page.
(Continued)

*Primary Examiner* — Victor D Batson
*Assistant Examiner* — Matthew J Sullivan
(74) *Attorney, Agent, or Firm* — Robert P. Michal, Esq.; Carter, DeLuca & Farrell LLP

(57) ABSTRACT

A fastening device for fastening soft surfaced elements to each other comprises a planar top portion and two side portions. The side portions are coupled with the planar portion at one end via an angle portion, and are arranged essentially perpendicularly in relation to said planar top portion and essentially parallel with each other thereby forming a receiving opening for receiving said element between the side portions. In addition the side portions both comprise at least one tooth, which is inclined towards the opening and the element in use and thereby arranged to fasten, such as via friction or via penetration into the surface of the element, and thereby fasten the device to the element. Moreover at least one of the portions comprises a protrusion portion for receiving, focusing and attaching a magnetic member to the device so to allow the device to be fastened to an external member via said magnetic member.

14 Claims, 2 Drawing Sheets

(51) Int. Cl.
  *F16B 5/00* (2006.01)
  *F16B 1/00* (2006.01)
  *F16B 5/06* (2006.01)

(52) U.S. Cl.
  CPC ... *E04F 2201/0107* (2013.01); *E04F 2201/06* (2013.01); *F16B 2001/0035* (2013.01); *F16B 2005/0678* (2013.01)

(56) References Cited

U.S. PATENT DOCUMENTS

| | | | |
|---|---|---|---|
| 3,522,923 A | | 8/1970 | Charpentier |
| 3,784,144 A | | 1/1974 | Ollinger et al. |
| 4,611,448 A | | 9/1986 | De Long |
| 5,722,126 A | | 3/1998 | Reiter |
| 6,484,374 B2 * | 11/2002 | McAllister | B65F 1/06 24/557 |
| 6,660,938 B2 * | 12/2003 | Herb | E04C 3/07 174/101 |
| 7,360,745 B2 * | 4/2008 | Nikayin | H02G 3/126 174/58 |
| 8,011,621 B2 * | 9/2011 | Korczak | F16L 3/127 248/231.81 |
| 8,191,836 B2 * | 6/2012 | Korczak | F16L 3/127 248/68.1 |
| 8,360,378 B1 | 1/2013 | Owens | |
| 10,323,669 B2 * | 6/2019 | Lamouche | F16B 5/126 |
| 10,415,723 B2 * | 9/2019 | Vaccaro | F16L 3/00 |
| 2007/0248793 A1 * | 10/2007 | Herb | B21B 27/00 428/122 |
| 2008/0014043 A1 | 1/2008 | Zasloff | |
| 2016/0047494 A1 | 2/2016 | Dickinson et al. | |

FOREIGN PATENT DOCUMENTS

| | | |
|---|---|---|
| CN | 204648885 U | 9/2015 |
| FR | 1493427 A | 9/1967 |
| WO | 2009099664 A1 | 8/2009 |
| WO | 2015196108 A1 | 12/2015 |

OTHER PUBLICATIONS

Cyberbond L.L.C., Technical Data Sheet: Cybercryl 1326, created Aug. 2003, 1 page.

European Patent Office, Supplementary European Search Report of EP17792560, dated Feb. 14, 2020, 4 pages.

* cited by examiner

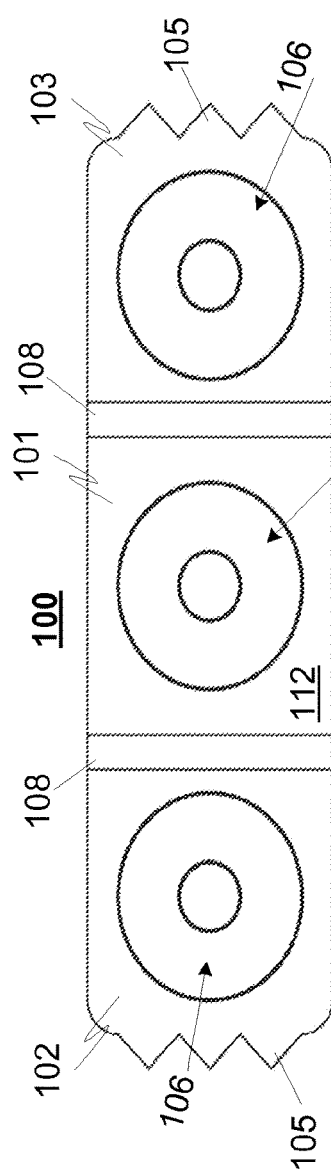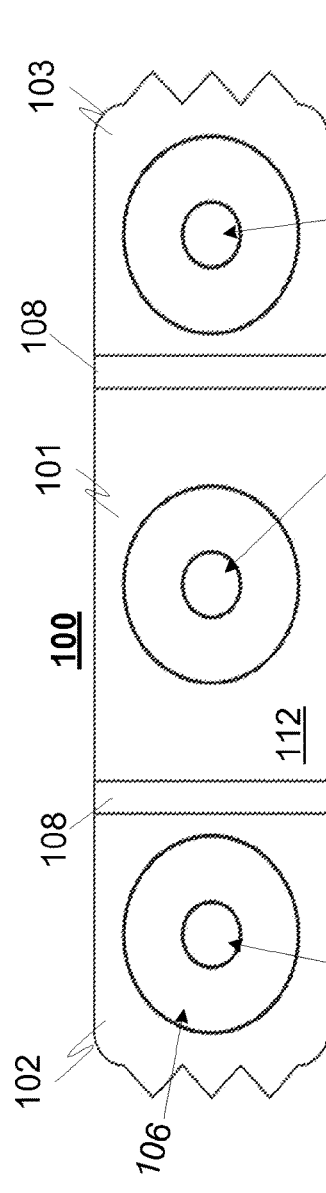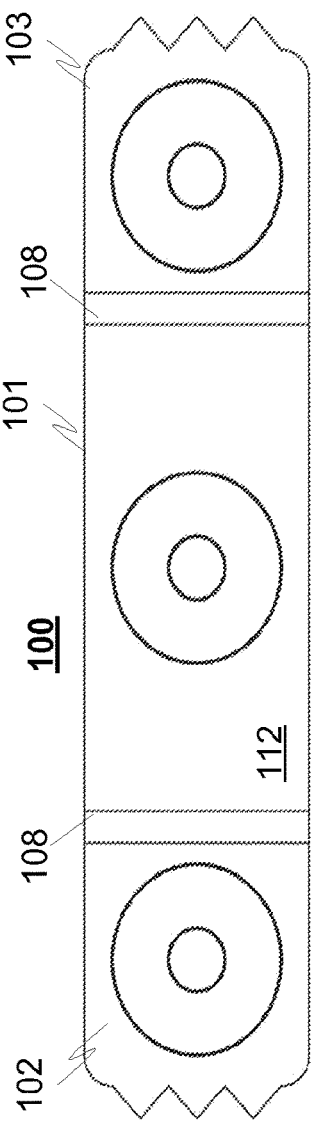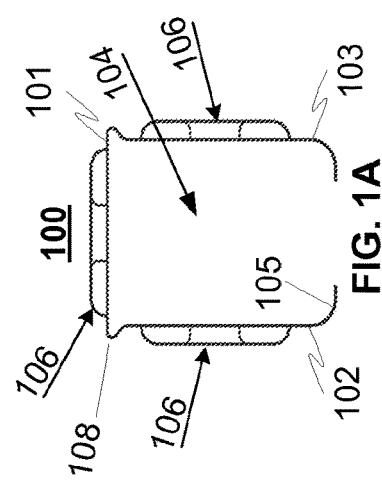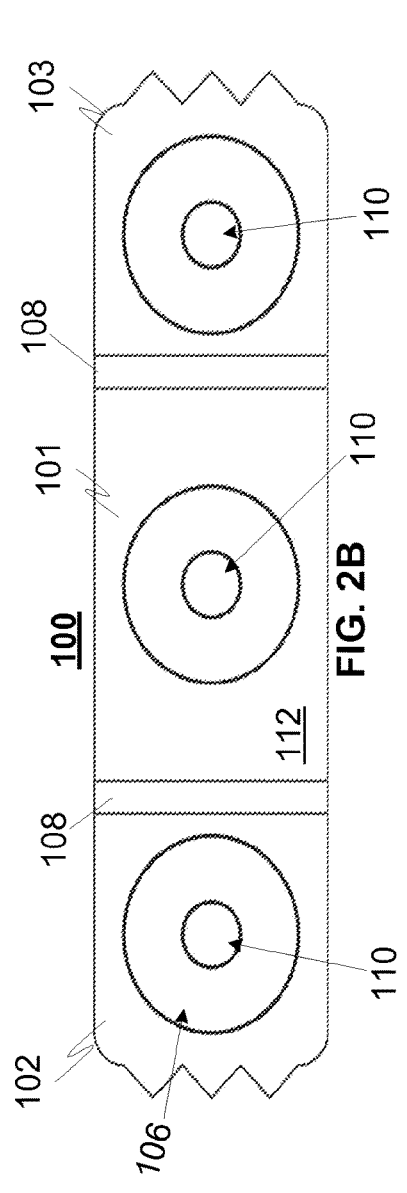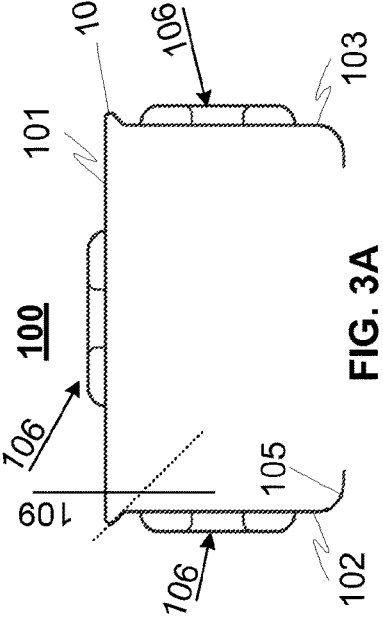

FASTENING DEVICE FOR FASTENING ELEMENTS

PRIORITY

This application is a U.S. national application of the international application number PCT/FI2017/050346 filed on May 4, 2017 and claiming priority of Finnish application No. 20165384 filed on May 4, 2016 the contents of all of which are incorporated herein by reference.

TECHNICAL FIELD OF THE INVENTION

The invention relates to a fastening device for fastening elements, and in particularly soft surfaced elements, such as wooden, surface peat, foam PVC, foam board, fibreboard, mineral wool or other wool or porosity material surface elements to each other as well as to external structures, such as walls or roofs. In addition the invention relates to a manufacturing method for manufacturing the fastening device.

BACKGROUND OF THE INVENTION

There are lots of different fastening solutions for fastening elements, such as for fastening board type elements to each other or to external structures, such as walls or roofs. Examples of these commonly known fastening solutions are screws and bolts with suitable nuts, as well as different types of adhesives, such as glue or tape.

There are however some disadvantages relating to the fastening solutions of the known prior art. For example the fastening operation as such is time consuming, because typically at first screw holes must be bored into the structure of the element, but also to the counterpart element or external structure where the elements is to be fastened. In addition a temporary fastening is challenging because after removing or demolishing the elements the screw holes or other marks are still left, which causes visual defects and drawbacks. It is to be noted that the demolishing the elements causes also screw holes or other marks to the elements and thus it might be that the elements cannot be used again.

SUMMARY OF THE INVENTION

An object of the invention is to alleviate and eliminate the problems relating to the known prior art. Especially the object of the invention is to provide a device for fastening the elements easily and fast so that there are no needs to provide any screw holes to the elements or other structures, and additionally offering possibility to very freely build any combination from the elements. In addition due to the embodiments of the invention the elements can be reused, because the fastening method and fastening device according to the invention does not make any marks or holes or other tracks or damages to the elements.

The object of the invention can be achieved by the features of independent claims.

The invention relates to a device for fastening the elements according to claim 1. In addition the invention relates to a manufacturing method for manufacturing the fastening device according to claim 11.

According to an embodiment of the invention a fastening device for fastening elements comprises a planar top portion and two side portions, which are coupled with said planar portion at one end via an angle portion. The side portions are advantageously arranged essentially perpendicularly in relation to the planar top portion and essentially parallel with each other thereby forming a receiving opening for receiving the element between the side portions.

The angle portion is advantageously inclined to extending towards the opening and intersecting a normal of said top planar portion at least in the end portion of said planar portion, whereupon the extent of the inclined angle portion determines the size of the opening for receiving the element. The angle portion offers advantage namely it prevents the planar top portion to be bent when the side portions are opened around the element to be fastened.

In addition the side portions both comprises at least one tooth, but more advantageously two and most advantageously at least three teeth, which are inclined towards the opening and the element when the device is in use. The tooth is arranged to fasten, such as via friction or to penetrate into the surface of the element and thereby fasten the device to the element. The typical element to be fastened is a soft surfaced element, such as a wooden, surface peat, foam PVC, foam board, fibreboard, mineral wool or other wool or porosity material surface elements. According to an embodiment at least one of the teeth may comprise friction surface so to fasten the device better also the hard surfaced element.

According to an embodiment at least one of the top planar and side portions comprises a protrusion portion for receiving a magnetic member to the device so to allow the device to be fastened to an external member via said magnetic member. The surface of the protrusion portion is advantageously elevated from the surface of the base portion where it locates, and in addition the protrusion portion comprises essentially the shape of the magnetic member to be received, such as a circular shape having essentially the same diameter as the magnetic member. Due to the configuration and shape of the protrusion portion it focuses, targets and attaches the magnetic member to the device precisely to the correct point, whereupon any possible misalignment of the plurality elements when fastened to each other can be effectively eliminated. Namely it has been found out that even a small misalignment of the magnet causes increasing deviation and inclination of the stacked elements, whereupon it would be impossible to build up a high and straight element structures, such as a wall, for example.

However, the protrusion portions according to the invention allow and make it possible to fasten the number of the devices with the elements to the external members via their magnetic members in a precise manner and to provide even large element combination with straight lines. It is to be noted that the external member may be e.g. another device or an external structure member, such as structure of a building, like a wall or roof structure member. Advantageously, if the device is fastened to another device or external structure member, another device or external structure member must be magnetic material, such as steel structure of the device or steel structure in the external structure member, such as a wall or a roof, for example. However, it is to be noted that according to an embodiment a first side of the magnet is configured to be faced against the device and the second side may comprise adhesive material, such as tape or glue, whereupon the device can be fastened to the external structure via the adhesive material even if the external structure would not comprise magnetic material at all.

As an example the device can have e.g. three magnetic members in total and connected simultaneously to each on the devices protrusion portions in each of the side portions and in the planar portion. As an example all these magnets can be fastened to the external member or structure simultaneously, whereupon e.g. 3D structures or combinations of the elements can be provided.

According to an embodiment the protrusion portion may also comprise a hole extending through the protrusion portion. The hole is an optional feature and it is advantageously for receiving a fixing member, such as a screw or bolt to additionally fastening the device to the element, which is received between the side portions and into the opening.

According to an embodiment both of the side portions may comprise a hole extending through the protrusion portion. The holes are arranged advantageously essentially at the same axis so that the both of the holes receive the same fixing member, such as a screw or bolt, extending through the opening and thereby fastening the device very tight to the element locating in the opening.

Advantageously, and according to an embodiment of the invention the device is made of one piece. In addition the material of the device is advantageously spring steel, even if another suitable material can also be used, which has spring force enough to press the side portions against the element introduced into the opening between the side portions.

In addition it is to be noted that according to an embodiment at least one portion of the device may also comprise a pattern, figure, letter or decoration, whereupon different kinds of esthetical impressions can be achieved.

The present invention offers advantages over the known prior art, such as possibility to easily and fast to fasten elements to each other via the devices or to another external structures, and especially so that there are no needs to provide any screw holes to the elements or other structures. Furthermore the embodiments of the invention offer possibility to very freely build any combination from the elements, as well as to modify also the complete combination already build, which is clear advantage in many cases, because there is no need e.g. to dismantle the structure combination or unscrew the bolts or the like before modifying or rebuilding.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which:

FIGS. 1A-3B illustrate a principle of exemplary devices of different sizes for fastening elements according to an advantageous embodiment of the invention.

DETAILED DESCRIPTION

Figure 4:
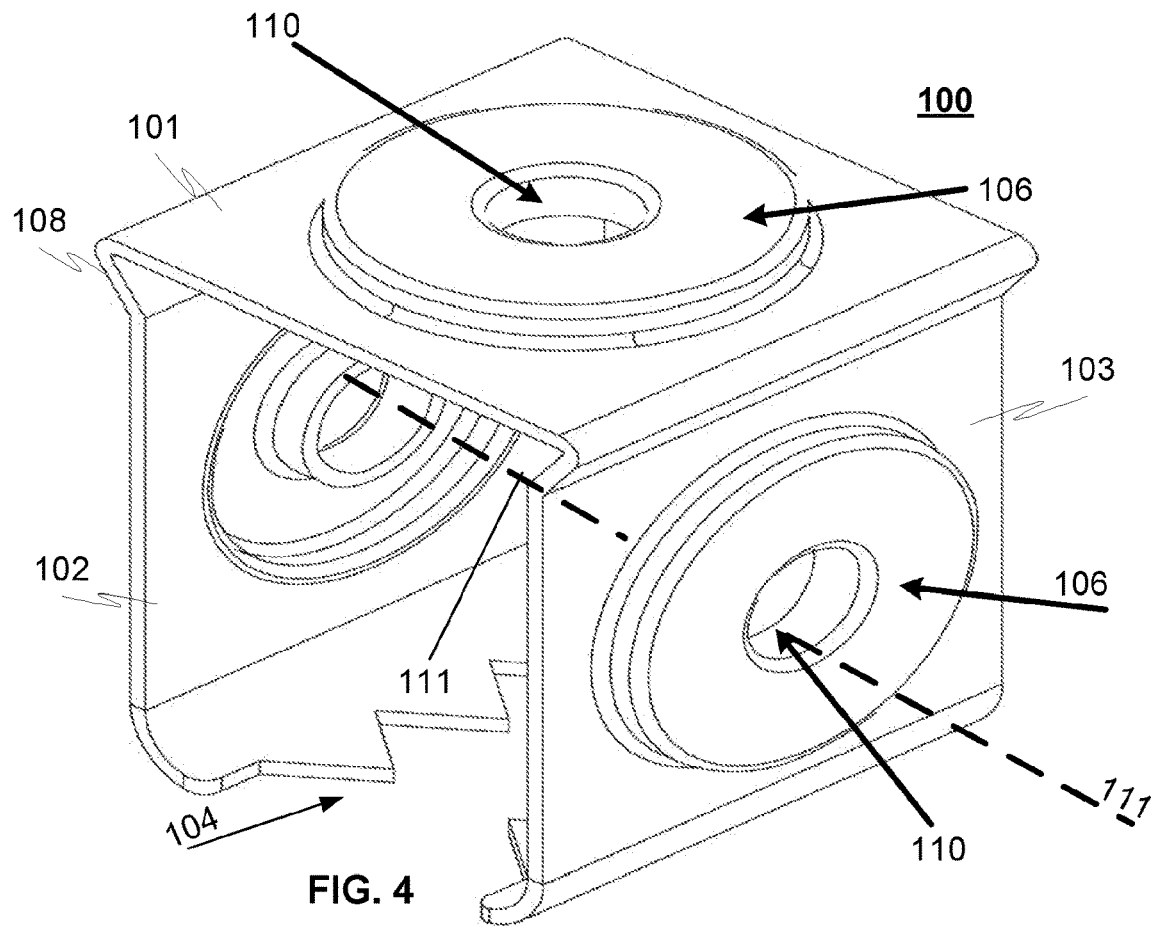
FIG. 4 illustrates an example of a device for fastening element according to an advantageous embodiment of the invention.
Figure 5:
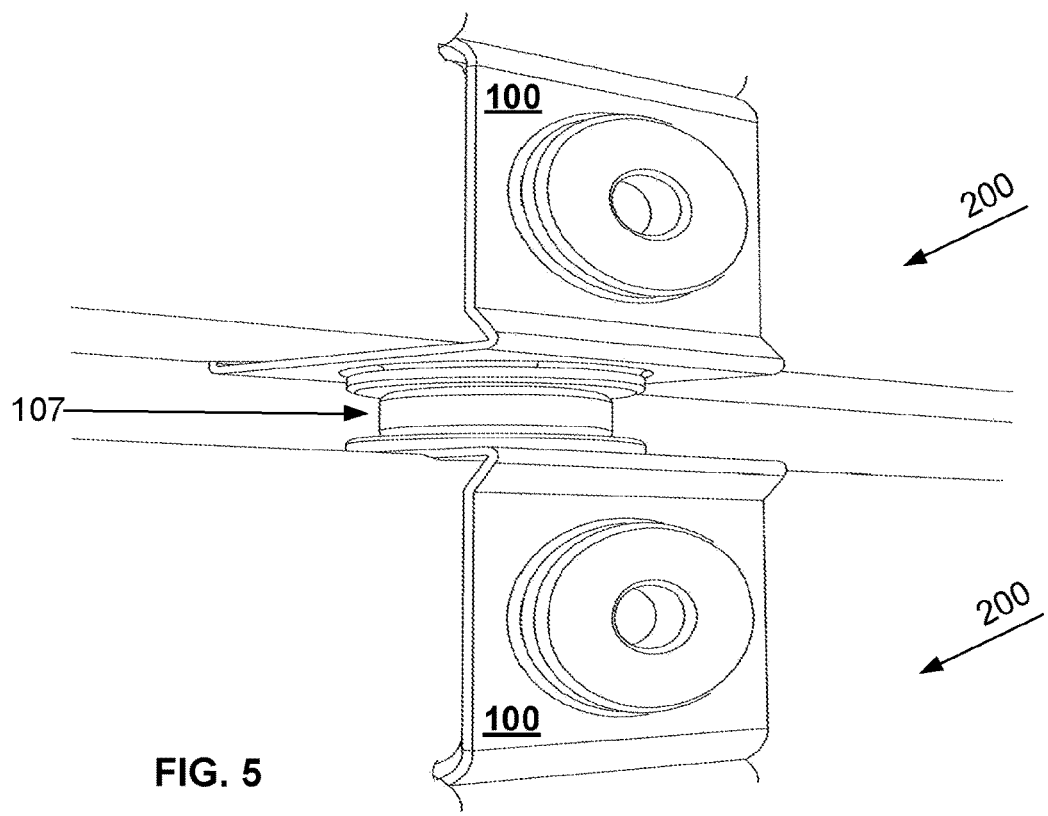
FIG. 5 illustrates an example of devices used for fastening elements to each other according to an advantageous embodiment of the invention.

FIGS. 1A-3B and 4 illustrate a principle of exemplary devices 100 of different sizes for fastening elements 200, and FIG. 5 an example of devices used for fastening elements to each other according to an advantageous embodiment of the invention. The fastening device 100 comprises a planar top portion 101 and two side portions 102, 103, which are coupled with said planar portion at one end via an angle portion 108. The side portions form a receiving opening 104 for receiving the element 200 between the side portions, as is described elsewhere in this document. The angle portion 108 is advantageously inclined to extending towards the opening 104 and intersecting a normal 109 of said top planar portion at least in the end portion of said planar portion, as can be seen in FIG. 3A.

The side portions both comprise at least one or more tooth/teeth 105, which are inclined towards the opening 104 and the element 200 when the device is in use.

The top planar and side portions 101, 102, 103 comprises a protrusion portion 106 for receiving a magnetic member 107 (FIG. 5) to the device 100 so to allow the device to be fastened to an external member, such as to other device 100 via the magnetic member 107. The surface of the protrusion portion 106 is elevated from the surface of the base portion 101, 102, 103 where it locates, and in addition the protrusion portion 106 comprises essentially the shape of the magnetic member 107 to be received, such as a circular shape having essentially the same diameter as the magnetic member 107, as can be seen e.g. in FIG. 4.

The protrusion portion 106 of the top portion may comprise also a hole 110 extending through the protrusion portion 106, as can be seen especially in FIG. 4. In addition, both of the side portions 102, 103 may also comprise a hole 110 extending through the protrusion portion 106. The holes of the side portions 102, 103 are arranged at the same axis 111.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The features recited in dependent claims are mutually freely combinable unless otherwise explicitly stated.

The invention claimed is:

1. A fastening device for fastening soft surfaced elements to each other, wherein the device comprises:
    a planar top portion,
    two side portions, each of which is coupled with said planar portion at one end, said side portions being arranged essentially perpendicularly in relation to said planar top portion and essentially parallel with each other thereby for, a receiving opening for receiving said element between the side portions, and said side portions both comprising at least one tooth, which is inclined towards the opening and the element in use and thereby arranged to fasten into the surface of the element and thereby fasten the device to the element,
    wherein at least one of said portions comprises a protrusion portion for receiving, focusing and attaching a magnetic member to the device so to allow the device to be fastened to an external member via said magnetic member, the protrusion portion being elevated from an outer surface of the at least one of said portions and protruding away from the opening, wherein at least one of the portions defines a hole, and said device comprises an angle portion between said planar top portion and side portion, wherein said angle portion is inclined to extending towards said opening and intersecting a normal of said top planar portion at least in an end portion of said planar portion, whereupon the extent of the inclined angle portion determines the size of the opening for receiving the element.

2. The device of claim 1, wherein said side portions both comprise at least one tooth, which is inclined towards the opening and the element in use and thereby arranged to penetrate into the surface of the element and fasten the device to the element.

3. The device of claim 1, wherein the top planar portion and each of the side portions comprise the protrusion portion for receiving, focusing and attaching the magnetic member to the device so to allow the device to be fastened to the external member via said magnetic member, the protrusion portions being elevated from an outer surface of each of the top portion and the side portions and protruding away from the opening.

4. The device of claim 1, further comprising the magnetic member, and wherein the protrusion portion comprises essentially the shape of the magnetic member.

5. The device of claim 1, wherein the hole of the at least one of the portions extends through the protrusion portion and is configured to receive a fixing member to additionally fasten the device to the element received between the side portions and in the opening.

6. The device of claim 1, wherein the hole extends through the protrusion portion of a first of the two side portions, and a second of the two side portions defines another hole, where said hole and said another hole are arranged essentially at the same axis, the direction of said axis being essentially the direction of the normal of the side portions and so that the both of the holes are configured to receive the same fixing member extending through the opening.

7. The device of claim 1, wherein the device is made of one piece.

8. The device of claim 1, wherein the material of the device is spring steel.

9. The device of claim 1, wherein at least one of said portions comprises a pattern, a figure, a letter or a decoration.

10. The device of claim 1, further comprising the magnetic member having first and second sides, where said first side is configured to be faced against the device and wherein the second side comprises an adhesive material, such as tape or glue to be fixed to an external structure.

11. A method for manufacturing a fastening device, wherein the method comprises:
manipulating a one piece raw material sheet so to provide a planar top portion, and provide two side portions, each of which is coupled with said planar portion at one end,
arranging said side portions essentially perpendicularly in relation to said planar top portion and essentially parallel with each other and thereby forming a receiving opening for receiving said element between the side portions,
arranging at least one tooth to each said side portions so that said tooth is inclined towards the opening and the element in use and thereby arranged to fasten into a surface of the element and fasten the device to the element,
providing a protrusion portion to at least one of said portions for receiving, focusing and attaching a magnetic member to the device and thereby to allow the device to be fastened to an external member via said magnetic member, the protrusion portion being elevated from an outer surface of the at least one of said portions and protruding away from the opening, and
providing an angle portion between said planar top portion and side portion so to incline said angle portion to extend towards said opening and intersect a normal of said top planar portion at least in an end portion of said planar portion, whereupon the extent of the inclined angle portion determines the size of the opening for receiving the element.

12. The device of claim 4, wherein the magnetic member has a circular shape, and the protrusion portion has a circular shape with essentially the same diameter as the magnetic member.

13. The device of claim 6, wherein said same fixing member is a screw or a bolt.

14. A fastening device for fastening soft surfaced elements to each other, the fastening device comprising:
a planar top portion,
two side portions, each of which is coupled with said planar portion at one end, said side portions being arranged essentially perpendicularly in relation to said planar top portion and essentially parallel with each other thereby forming a receiving opening for receiving said element between the side portions, and said side portions both comprising at least one tooth, which is inclined towards the opening and the element in use and thereby arranged to fasten into the surface of the element and thereby fasten the device to the element, wherein:
at least one of said portions comprises a protrusion portion for receiving, focusing and attaching a magnetic member to the device so to allow the device to be fastened to an external member via said magnetic member,
both of the side portions comprise a hole extending through the protrusion portion, where said holes are arranged essentially at the same axis, the direction of said axis being essentially the direction of the normal of the side portions and so that the both of the holes are configured to receive the same fixing member extending through the opening, and
said device comprises an angle portion between said planar top portion and side portion, wherein said angle portion is inclined to extending towards said opening and intersecting a normal of said top planar portion at least in an end portion of said planar portion, whereupon the extent of the inclined angle portion determines the size of the opening for receiving the element.

* * * * *